US007618932B2

(12) United States Patent
Preuschen et al.

(10) Patent No.: US 7,618,932 B2
(45) Date of Patent: Nov. 17, 2009

(54) PROCESS FOR PRODUCING A SHAPED DETERGENT BODY WITH A HIGH BUILDER CONTENT

(75) Inventors: Judith Preuschen, Ludwigshafen (DE); Ralf Wiedemann, Ludwigshafen (DE)

(73) Assignee: Reckitt Benckiser N.V, Hoofddorp (NL)

( * ) Notice: Subject to any disclaimer, the term of this patent is extended or adjusted under 35 U.S.C. 154(b) by 359 days.

(21) Appl. No.: 10/574,426

(22) PCT Filed: Oct. 11, 2004

(86) PCT No.: PCT/GB2004/004324

§ 371 (c)(1), (2), (4) Date: May 2, 2006

(87) PCT Pub. No.: WO2005/035709

PCT Pub. Date: Apr. 21, 2005

(65) Prior Publication Data

US 2006/0293211 A1 Dec. 28, 2006

(30) Foreign Application Priority Data

Oct. 9, 2003 (GB) ................................ 0323659.3

(51) Int. Cl.

*C11D 11/00* (2006.01)
*C11D 17/00* (2006.01)
*B29C 45/00* (2006.01)

(52) U.S. Cl. ....................... 510/445; 510/224; 510/294; 510/298; 510/441; 264/328.1

(58) Field of Classification Search ................. 510/445, 510/294, 298, 224, 441; 264/328.1

See application file for complete search history.

(56) References Cited

U.S. PATENT DOCUMENTS

| | | | | |
|---|---|---|---|---|
| 2,987,484 | A | 6/1961 | Lundberg et al. | |
| 3,407,144 | A | 10/1968 | Bath | |
| 5,858,939 | A * | 1/1999 | Tsaur | 510/141 |
| 6,224,812 | B1 | 5/2001 | Allan et al. | |
| 6,291,421 | B1 | 9/2001 | Jacques et al. | |
| 6,555,509 | B2 * | 4/2003 | Abbas et al. | 510/143 |
| 7,256,168 | B2 * | 8/2007 | Raehse et al. | 510/446 |
| 2001/0011067 | A1 | 8/2001 | Allan et al. | |
| 2001/0044067 | A1 | 11/2001 | Koide | |
| 2002/0010123 | A1 | 1/2002 | Schmiedel et al. | |
| 2003/0050216 | A1 | 3/2003 | Robinson et al. | |

FOREIGN PATENT DOCUMENTS

| | | | |
|---|---|---|---|
| EP | 0 716 144 | A | 6/1996 |
| WO | WO 01/02532 | A | 1/2001 |
| WO | WO 01/88079 | A1 * | 11/2001 |

* cited by examiner

*Primary Examiner*—Lorna M Douyon
(74) *Attorney, Agent, or Firm*—Norris McLaughlin & Marcus, P.A.

(57) ABSTRACT

A process for producing a shaped detergent body having a solid component comprising at least 65 wt % of builders, wherein the process comprises injection molding.

17 Claims, No Drawings

PROCESS FOR PRODUCING A SHAPED DETERGENT BODY WITH A HIGH BUILDER CONTENT

The present invention relates to a detergent body containing a high proportion of solid materials. The body is prepared by injection moulding.

In applications involving washing agents, detergents and other detergent formulation components, tablets have established a place for themselves on the market in recent years as a format that provides easy metering and is simple to use.

Tablets typically comprise a mixture of components that are solid at room temperature and components that are liquid at room temperature. Commonly the solid components are present in granular form for ease of processing and speed of dissolution/dispersion.

The tablets are normally prepared by admixture of the tablet components followed by compaction to a shaped body. These compressed tablets suffer from several disadvantages.

Firstly, even though the compaction pressure used is high the tablets are still friable. This leads to dust formation and, in some cases, tablet breakage. This problem has not been successfully addressed by the incorporation of binders within the tablet.

Additionally, as the tablet components are usually highly hygroscopic, on exposure to atmospheric air, the tablet absorbs moisture. With moisture absorption the tablet deforms and eventually looses its structural integrity. To counter this effect a water resistant container/wrapper is required to ensure tablet stability, requiring an additional step in the manufacturing process.

These and other disadvantages are also relevant for multi-phase tablets, tablets which contain one or more component formulations commonly present in a layered arrangement/body with insert formation.

Multi-phase tablets also suffer from complex manufacturing techniques: either a complex multi-stage manufacturing process involving a number of layers being compressed together (after possible separate pre-formation) and/or the insertion of an insert into cavity of a pre-formed body is required.

For the layered structures a compromise has to be reached between a sufficiently high compression pressure so that the layers are adequately bonded together and a sufficiently low compression pressure so that tablet in-wash dissolution/dispersion time is not unduly prolonged. This compromise often has unsatisfactory results leading to tablets having poor stability with detrimental effects such as layer separation.

For the tablets having an insert, there is the issue of insert addition which requires a highly precise manufacturing process and the problem of insert separation caused by poor adhesion to the tablet body.

Detergent tablets may also be prepared using extrusion techniques. In this method the tablet components are inserted into an intrusion device and extruded.

Tablets produced in this way also suffer from several disadvantages.

Most of the disadvantages arise as a result of the fundamentals of the extrusion process: the extrudate is typically tubular, which is then divided into tablet portions, usually in a cutting technique. It has been found to be very difficult to cut the extrudate into individual tablets without causing deformation to the tablet. Thus the tablets produced are not rectilinear but instead are distorted, especially around the cut edges.

Additionally due to the manner in which the extrudate is produced there is virtually no flexibility in the shape of the final tablet (with the exception of the shape of the extrusion die): the extruded tablets must be based on a kind of tubular form. This problem is particularly exacerbated for multi-phase tablets.

Also for multi-phase tablets there is a further disadvantage in that little or no flexibility is allowed in the relative proportions in the phases. This problem is described more clearly in Patent Application WO-A-01/02532. Herein a multi-phased tablet (in this case two phases) is described, in which of the two phases the minor phase has to have a thickness of at least 5 mm for the integrity of the tablet to be preserved.

It is an object of the present invention to mitigate/overcome the problems outlined above.

According to the first aspect of the invention there is provided a detergent body containing a high proportion of a solid component, wherein the detergent body is produced in an injection moulding process.

We have surprisingly found that high solid content compositions can be processed in an injection moulding process into a detergent body. This is unexpected as normally injection moulding is only considered suitable for composition predominantly comprised of thermoplastic materials that melt/soften (such as waxes) during the injection moulding process. Solid containing compositions are not normally processed in this way due to the detrimental abrasive effect of the solid component. This is particularly important in a detergent context as many detergent materials, such as builders, for example, are typically solid at room temperature.

Furthermore, the bodies have been found to have excellent physical properties including very smooth/glossy external surfaces and extremely low friability. Indeed friability has been found to be especially low at the apexes of the detergent body. Thus the problems exhibited by prior art tablet compositions of dust formation/high friability have been addressed.

Generally the detergent body formulation comprises a binder.

The binder is preferably present at 5-50 wt %, more preferably 5-40 wt % and most preferably 10-30 wt % (e.g. such as between 10-20 wt %) of the formulation of the detergent body.

The binder is most preferably a thermo-plastic material. Preferably the binder comprises a material which is solid at 30° C., most preferably at 35° C. Such material has been found to display excellent properties in body formation and body stability. More specifically the binder has been found to have the ability to aid the passage of the detergent body formulation into the injection moulding body and also to hold the body together after moulding.

Furthermore, the binder has been found to coat the solid component of the detergent body. This is advantageous as with the preferred binders, the previously observed problem of hygroscopicity of the solid components has been reduced. Also as the solid components are coated by the binder the problem of detrimental interaction of mutually incompatible solids (such as enzymes and bleaches) has been vastly reduced.

Preferred examples of binders include poly-ethylene-glycol (PEG) substituted and non-substituted synthetic and natural waxes (in both cases water soluble and non-water soluble, sugars and derivatives thereof, gelatine (combined with a sugar and/or a solvent (such as a liquid polyol, e.g. glycerine), non-ionic surfactants such as alkoxylated fatty acids/alcohols; water soluble or water dispersible oligomers and polymers (both substituted and non-substituted) such as poly-vinyl-alcohol (PVA), poly-vinyl-pyrrolidone (PVP), cellulose, polycarboxylic acids and co-polymers/derivatives thereof.

Most preferably the binder is PEG. Preferred examples of PEG have a molecular mass of 1500, 6000, 8000, 20000, 35000 or 8 million.

The term solid is to be understood as referring to a material which is solid at the processing temperature (temperature reached during the injection moulding process). Preferably the solid content of the detergent body is at least 50 wt %, more preferably at least 65 wt % and most preferably at least 80 wt %.

Generally the solid component comprises at least 50 wt % builders.

The preferred builder material is of the oligocarboxylate or polycarboxylate type, such as compounds selected from the group consisting of citric acid (and salts, e.g. alkali metal salts thereof), methylglycinediacetic acid (and salts, e.g. alkali metal salts thereof), sodium polyacrylate (and its co-polymers), sodium gluconate and mixtures thereof. Most preferably the builder is an alkali metal (e.g. sodium/potassium) citrate salt.

Optionally the builder material at least partially comprises a phosphorous based builder, such as a tripolyphosphate, e.g. sodium and/or potassium tripolyphosphate.

The solid component may comprise other conventional solid detergent components such as enzymes (e.g. proteases amylases or lipases), especially when in crystalline/particulate format, bleaches (such as percarbonate or perborate compounds, chlorine bleach compounds and peracid compounds), bleach activators (such as TAED or metal catalysts) and alkalis (such as hydroxides/carbonates).

Generally the detergent body formulation comprises a lubricant. Such a material has been found to display excellent properties in body formation. Namely the lubricant has the ability to facilitate the transport of the detergent body formulation into/within the injection moulding mould.

This has a positive effect on the energy required for the required detergent body processes. Also it has an effect on reducing the wear of the injection mould equipment.

The lubricant is preferably present at 0.1 wt % to 10 wt %, preferably from 0.2 wt % to 5 wt %. It has been found that at such a small percentage the effect of the lubricant on the final shape of the detergent body is minimised.

Preferred examples of lubricants include; fatty acids and derivatives thereof, such as alkali metal and ammonium salts of fatty acid carboxylates (e.g. ammonium stearate, sodium oleate, potassium laureate), also PEG/glycerol functionalised with fatty acid carboxylates (e.g. PEG mono-oleate, PEG ricinoleate, glycerol mono-ricinoleate); sucrose glycerides; oils (olive oil, silicon oil, paraffin oil); and low melting point non-ionic surfactants.

The detergent body may have a coating. Where present the coating may be employed to provide an additional layer of protection to the detergent body. Additionally/alternatively the coating may be used to attach a second or further detergent body to the original detergent body.

Where present the coating comprises 0.1 wt % to 5 wt %, preferably from 0.2 wt % to 2 wt % of the detergent composition.

Most preferably the coating is dispersible/soluble in water. Preferred examples of coating materials include fatty acids, alcohols, diols, esters, ethers, mono and di-carboxylic acids, polyvinyl acetates, polyvinyl pyrrolidones, polylactic acids, polyethylene glycols and mixtures thereof.

Preferred mono-carboxylic acids comprise at least 4, more preferably at least 6, even more preferably at least 8 carbon atoms, most preferably between 8 and 13 carbon atoms. Preferred dicarboxylic acids include adipic acid, suberic acid, azelaic acid, subacic acid, undecanedioic acid, dodecandoic acid, tridecanedioic and mixtures thereof.

Preferred fatty acids are those having a carbon chain length of from $C_{12}$ to $C_{22}$, most preferably from $C_{18}$ to $C_{22}$.

The coating layer may also include a disrupting agent.

The detergent body may further include other common detergent components such as corrosion inhibitors, surfactants, fragrances, anti bacterial agents, preservatives, pigments and dyes.

The detergent body is preferably for use in an automatic washing process in an automatic washing machine. Most preferably the detergent body is for use in an automatic dishwashing process.

According to a second aspect of the invention there is provided a process for producing a detergent body containing a high proportion of a solid component, wherein the process comprises injection moulding.

It will be appreciated that features of the first aspect of the invention shall apply mutatis mutantis to the second aspect of the invention.

It has been found that detergent bodies produced using the production process of the second aspect of the invention have excellent properties resulting from the injection moulding component.

Firstly, it has been observed that the bodies produced have a high density. This is especially beneficial where the body is for use in an automatic washing machine (particularly a dishwashing machine) as normally there is only limited space for accommodating the detergent body. Thus by using the process of the present invention a small dense detergent body may be produced, wherein the said body contains sufficient detergent active to achieve its washing requirements yet is able to fit into the space provided in a washing machine.

Additionally as the body is produced by an injection moulding process there is much greater flexibility over the shape of the body produced. This can be useful if the body has to be accommodated in a specific space (see the paragraph above). It is also useful from a design freedom/aesthetic view point; no longer need the detergent body be based on the limited range of shapes that can be produced by compression or extrusion, any moulded shape can be produced.

Furthermore it has been observed that when bodies are produced by injection moulding, wherein the bodies comprise a particulate component, there is much greater flexibility of particle size of the particulate component. This is in contrast to particulate bodies produced in a compression process wherein to produce coherent bodies there is usually an upper limit on the particle size of around 1500 μm: if the particle size is any greater the integrity of the body becomes compromised. Whereas in accordance with the process of the present invention bodies can be produced comprising a particulate component having a particle of bigger than 1500 μm.

The use of larger particle sizes in the bodies provides several advantages in the production process. Primarily the use of larger particle sizes permits the use of a lower amount of binder with obvious cost saving advantages. Also the problem of pipework/conduit vessel coating, which is a recognised issue for small particles (especially when used in small quantities) is vastly reduced.

It has also been observed that a broad range of particle sizes can be used in the process according to the present invention. This is in contrast to conventional compression processes wherein there is a need for a narrow particle size distribution to avoid segregation of ingredients.

A preferred particle size is between 50 μm and 2000 μm with any particle size distribution within these limits.

These advantages may be realised without incurring any detrimental effect on other tablet properties (such as strength, dissolution speed, etc)

The preferred processing method is as follows:

a) Feed the materials to the barrel (hopper) of the injection unit (injection unit is to be understood as being the barrel, the screw and the nozzle) of the injection moulding machine.

b) Cause the added admixture to be progressed along the barrel of the injection moulding machine towards the injection nozzle. As the admixture progresses along the barrel it is mixed and heated above the plastification temperature of the binder.

c) The composition is injected into the mould at temperatures above the plastification temperature.

d) In the mould the composition is allowed to chill.

e) The mould is opened and the shaped body is ejected from the mould.

The process may include one or more of additional steps(f) and/or (g):

f) The body is coated with a coating material.

g) The body is packed (e.g. with foil wrapping, box or bag packing). The packaging material may be used to provide a moisture barrier.

In step (a) the component materials may be blended before addition to the barrel.

In step (a), as an alternative, one of the binder and/or lubricant components may be partially/fully added to the admixture inside the barrel of the injection unit of the machine by additional feeding stations.

In step (a) the component materials (particularly the binder) are added to the barrel preferably at a temperature below the plastification of the binder system to allow smooth feeding.

As an alternative in step (a) the component materials, optionally including the binder, may be heated above the plastification point of the binder and then added to the barrel.

In step (c) the pressure at the nozzle of the injection moulding machine while injecting is preferably less than 100 bar, more preferably less than 50 bar and most preferably less than 30 bar. Using these relatively low injection pressures (and consequently low injection temperatures) it has been found that the integrity (and hence the activity) of any enzyme present in the injected composition is largely preserved.

In an alternative embodiment the process is performed using an injection unit which comprises a barrel equipped with a piston to press the detergent composition into the mould. In this case the detergent composition needs to be heated above its plastification temperature and vigorously mixed before being placed in such injection unit. The detergent composition can then be injected into the mould.

The process of the present invention may be used in the preparation of multi-phase detergent bodies.

For manufacturing a multi phase detergent body the process is most preferably performed using a machine which comprises a plurality of injection units. Each injection unit is able to process a different composition.

Thus for manufacturing a multi phase detergent body the mould may be configured such that it can be accessed by a plurality of injection units. Thus a first injection unit may be used to inject a first composition into a first portion of the mould. Simultaneously (or subsequently) a second injection unit may be used to inject a second composition into a second portion of the mould. Movement of the mould relative to one or more of the injection units may occur at a part of the process.

As an alternative the mould may be opened after injection and chilling of the composition of the first phase of the detergent body. The original mould counter part which was moved in order to open the mould may be discarded and replaced with a second mould counter part. The mould may then be closed with the second mould counter part leaving a void space and the composition of the second phase injected therein.

As an further alternative the mould may be arranged such that it comprises a moveable member which affects the volume within the mould. Most preferably the member may be arranged in at least two orientations: in a first orientation a first volume is defined within the mould and in a second orientation a second (preferably larger) volume is defined within the mould. Thus a first composition may be injected into the mould with the member in its first orientation. The first injected composition may then be allowed to cool. The member may then be moved to its second orientation, thus realising a void space into which a second composition may be injected.

A yet further alternative is that the mould may be opened after injection and chilling of the composition of the first phase of the detergent body. The first phase of the detergent body may be expelled from the mould and inserted into a second mould which after closing comprises a void space. The composition of the second phase may be injected into the void space.

For all options above the described process steps may be repeated for the injection of a third/subsequent composition. A combination of the different alternatives may also be used.

It has been observed in the process according to the invention that it can be used for the production of multi-phase detergent bodies having excellent properties. These properties include much greater flexibility in the relative arrangement of the phases as the arrangement of the phases in now no longer overruled by gravity and gravity controlled feed techniques as used in prior art multi-phased tablets produced by conventional compression processes.

Additionally the relative sizes of the phases is much more flexible: any relative size of phases is possible, no pre-set relationship is required as in extrusion processing prior art.

Furthermore, where a different binder is used in each phase, the release/dissolution/dispersion properties of each phase can easily be controlled. The said control has been found to be much more precise as it is no longer influenced by compression pressures; this has been found to be a particular problem wherein two phase tablets were formed by a compression method with the second phase being compressed on top of the already compressed first phase. This led to variations in the compression pressures of the phases and variations in the tablet phase dissolution dispersion rate.

The invention is now described with reference to the following non-limiting examples.

EXAMPLES

Formulation Preparation

Several Formulations were prepared in accordance with the following table.

In each case tablets of 20 g were produced. The tablets were rectangular in shape (26 mm×36 mm×14 mm) with a small indentation on one of the largest faces (suitable for insertion of a second detergent composition component).

| Components % | Formulation 1 | 2 | 3 | 4 | 5 | 6 | 7 | 8 | 9 |
|---|---|---|---|---|---|---|---|---|---|
| STPP | 24 | 24 | 24 | 24 | 24 | 32 | 32 | 37.6 | — |
| Sodium-Citrate | 48.25 | 48.25 | 48.25 | 48.25 | 53.25 | 17.6 | 17.6 | — | 49 |
| Protease, speckles | 0.75 | 0.75 | 0.75 | 0.75 | 0.75 | — | — | 0.6 | 1.5 |
| Amylase, speckles | 0.5 | 0.5 | 0.5 | 0.5 | 0.5 | — | — | 0.4 | 0.5 |
| Sulphonated Polymer | 5 | 5 | 5 | 5 | 5 | — | — | — | 5 |
| Nonionic Surfactant | 1.5 | 1.5 | 1.5 | 1.5 | 1.5 | 1.2 | 1.2 | 1.2 | 1 |
| PEG $M_w$ = 20000 g/mol | 20 | 20 | 15 | 15 | 10 | — | — | — | — |
| Copolymer PVP-VA | — | — | 5 | 5 | 5 | — | — | — | 2 |
| Sodium Disilicate | — | — | — | — | — | 2.8 | 2.8 | 2.8 | 1 |
| Soda Ash | — | — | — | — | — | 23.2 | 23.2 | 23.2 | 8 |
| PA Homo-polymer | — | — | — | — | — | 3.2 | 3.2 | 1.2 | 5 |
| PEG $M_w$ = 6000 g/mol | — | — | — | — | — | 20 | — | 20 | 12 |
| Fatty Acid Alcohol 25 EO | — | — | — | — | — | — | 20 | — | 5 |
| Sodium Percarbonate | — | — | — | — | — | — | — | 9.6 | — |
| TAED | — | — | — | — | — | — | — | 3.2 | — |
| Sodium Phosphonate | — | — | — | — | — | — | — | 0.04 | — |
| Silver Corrosion inhibitor | — | — | — | — | — | — | — | 0.2 | — |
| Methyylglycinediacetic - acid salt | — | — | — | — | — | — | — | — | 10 |
| Granulation | R | F | R | F | R | R | R | R | R |
| Formation Temperature (° C.) | 100 | 100 | 100 | 100 | 100 | 70 | 70 | 70 | 60 |
| Formation Pressure (bar) | 500 | 500 | 500 | 500 | 600 | 250 | 250 | 250 | 50 |

Definition of fine and rough granulation:
R = Rough Granulation: 200 to 1200 μm particle size (70% of granules are in the range of 400 μm to 1000 μm).
F = Fine Granulation: 0-600 μm particle size (70% of granules are in the range of 50 μm to 300 μm)

Formulation Dissolution Measurement

Each Formulation was tested to measure its dissolution time.

Two different dissolution tests were used as below.

Test #1

A Bauknecht Avanti GSF dishwasher is filled with 4 L of water and heated up to 50° C.

The injection moulded Body is placed on the bottom of the dishwasher and allowed to dissolve. The spray arm is used to distribute the water as in a normal wash cycle.

The dissolution is measured by measuring conductivity of the water medium. When the conductivity value stays constant and does not increase any further it is assumed that the injection moulded Body has completely dissolved. This point is taken as the dissolution time. The measurement is repeated 3 times and the average value is calculated.

This test was carried out on Formulations 1 to 5 and the results are shown in Table 1.

TABLE 1

| | Formulation 1 | 2 | 3 | 4 | 5 |
|---|---|---|---|---|---|
| Dissolution Time (min) | 22 | 23 | 42 | 40 | 50 |

Test #2

A 1 L beaker is filled with 800 mL of tap water. The water is heated to 40° C. and maintained at that temperature with a coil immersion heater having an associated contact thermometer.

With a standard pharmaceutical disintegration tester (Erweka brand) with up-and-down moving sieves the shaped bodies are moved up-and-down in the water. The point of complete dissolution is defined as the point when the whole shaped body is dissolved/disintegrated from the basket.

This test was carried out on Formulations 6 to 8 and the results are shown in Table 2.

TABLE 2

| | Formulation 6 | 7 | 8 |
|---|---|---|---|
| Dissolution Time (min) | 20 | 45 | 21 |

SUMMARY

General:

Powder Formulations with rough and fine granulation can be injection moulded into tablet shapes, (see particularly Formulation 1 and Formulation 2).

All shaped bodies had very smooth surfaces and a glossy appearance. The bodies all showed low dusting and very low friability.

The dissolution times of these Formulations (especially Formulations 1, 2 and 6) are very short and are similar to release profiles of current dishwasher tablets commercially available.

Granulometry:

Formulation 1 and Formulation 2 compare the use of different granule sizes in the process.

Surprisingly both granulometries can be used exchangeable yet produce tablets having very similar properties: the change in granulometry was shown to have no effect on the dissolution characteristics of the tablet products. Also there were no differences in the ease with which the tablets could be processed: the injection moulding process was unaffected by a change in particle granulometry. This is surprising and is in contrast to conventional compressed particulate tablets where the particle granulometry has a huge effect on tablet dissolution time.

Binder:

A binder content of 15 wt % is sufficient for a smooth injection moulding processing operation. The operation has been shown to be possible with a wide range of different binders.

We have shown that by modifying the binder system different dissolution speeds can be altered. This can be used to make multi phase products displaying sequential dissolution.

This effect may be illustrated with reference to Formulations 1 and 3. These Formulations have almost the same composition and are made in the same way. The difference between the Formulations is that in Formulation 1 the binder is PEG ($M_w$=20000 present at 20 wt % of the Formulation) whereas in Formulation 3 the binder comprises 15 wt % PEG $M_w$=20000 and 5% polypyrrolidone-polyvinylacetate copolymer (PVP-VA). The dissolution times of Formulation 3 is twice that of Formulation 1.

A similar comparison can be made between Formulations 2 and 4 and also between Formulations 6 and 7.

Stability of Ingredients:

Formulation 3 was tested directly after processing. It was found that the enzymes in the formulation (amylase, protease) were each at 50% of their original activity level.

Formulation 9 was tested directly after processing. It was found that the enzymes in the formulation (amylase, protease) were each at 100% of their original activity level.

Further studies were undertaken to show the impact of injection moulding pressure/temperature on enzyme stability on Formulation 9. The results of these studies are shown in Tables 3 & 4.

TABLE 3

| | Injection Pressure (bar) | | | | |
|---|---|---|---|---|---|
| | 400 | 200 | 100 | 50 | 30 |
| % age Enzyme Activity after Processing | 20 | 40 | 90 | 100 | 100 |

TABLE 4

| | Injection Temperature (° C.) | | | |
|---|---|---|---|---|
| | 100 | 90 | 70 | 60 |
| % age Enzyme Activity after Processing | 20 | 40 | 90 | 100 |

Formulation 8 was stored at 30° C./70% rH and was analytically checked after 6 weeks.

After 6 weeks it was found that Formulation 8 still had from 90 to 100% of the starting material of TAED, BTA and percarbonate. This is more than typically obtained in storage tests of corresponding tablet products made by compression.

The invention claimed is:

1. A process for producing a detergent body having a solid component comprising at least 65 wt % of a builder selected from the group consisting of oligocarboxylate compounds, polycarboxylate compounds, phosphorus based builder, and mixtures thereof, comprising the following steps:

a) feeding component materials comprising the builder and a binder for producing a composition to a barrel or hopper of an injection unit of an injection molding machine;

b) causing the component materials to be progressed along the barrel of the injection molding machine towards an injection nozzle;

c) injecting the component materials into a mold at a temperature above the plastification temperature of the binder;

d) allowing the composition to chill in the mold; and e) opening the mold and ejecting a shaped body therefrom.

2. A process according to claim 1, wherein the builder is an alkali metal citrate salt.

3. A process according to claim 1, wherein the binder comprises from 5 to 30 wt % of the detergent body.

4. A process according to claim 3, wherein the binder comprises from 5 to 20 wt % of the detergent body.

5. A process according to claim 3, wherein the binder comprises a thermoplastic material having a melting point of about 35° C.

6. A process according to claim 3, wherein the binder is polyethylene glycol having a molecular mass of between 1,500 to 35,000.

7. A process according to claim 1, wherein the process comprises adding a lubricant as a component material.

8. A process according to claim 7, wherein the lubricant comprises from 0.1 to 10 wt %.

9. A process according to claim 1, wherein the shaped body is coated with a coating material.

10. A process according to claim 1, wherein the shaped body is packed with a packaging material.

11. A process according to claim 1, wherein the component materials are blended before addition to the barrel.

12. A process according to claim 1, wherein the binder or at least one lubricant component is at least partially added to the admixture inside the barrel of the injection unit of the injection molding machine by additional feeding stations.

13. A process according to claim 1, wherein in step (a) the component materials are added to the barrel at a temperature below the plastification temperature of the binder.

14. A process according to claim 1, wherein in step (a) the component materials are added to the barrel at a temperature above the plastification temperature of the binder.

15. A process according to claim 1, wherein in step (c) a pressure at the nozzle of the injection molding machine while injecting is higher than 50 bar.

16. A process according to claim 1, wherein the process is performed using a machine which comprises a plurality of injection units with each injection unit able to process a different composition.

17. A process for preparing multi-phase detergent bodies according to claim 1.

* * * * *